(12) United States Patent
Xu et al.

(10) Patent No.: US 10,310,555 B2
(45) Date of Patent: Jun. 4, 2019

(54) CONNECTOR FOR IMAGE CAPTURING DEVICE AND DISPLAY DEVICE INCLUDING THE CONNECTOR

(71) Applicant: BOE Technology Group Co., Ltd., Beijing (CN)

(72) Inventors: Jian Xu, Beijing (CN); Yongda Ma, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 8 days.

(21) Appl. No.: 15/504,704

(22) PCT Filed: Sep. 30, 2016

(86) PCT No.: PCT/CN2016/101063
§ 371 (c)(1),
(2) Date: Feb. 17, 2017

(87) PCT Pub. No.: WO2017/118112
PCT Pub. Date: Jul. 13, 2017

(65) Prior Publication Data
US 2018/0107243 A1 Apr. 19, 2018

(30) Foreign Application Priority Data
Jan. 5, 2016 (CN) .................... 2016 2 0009297 U (51) Int. Cl.
*G06F 1/16* (2006.01)
*G03B 17/56* (2006.01)
*H04N 5/225* (2006.01)

(52) U.S. Cl.
CPC ......... *G06F 1/1607* (2013.01); *G03B 17/561* (2013.01); *G06F 1/16* (2013.01); *H04N 5/2252* (2013.01); *H04N 5/2253* (2013.01); *H04N 5/2257* (2013.01)

(58) Field of Classification Search
CPC ............................ G06F 1/1605; G06F 1/1607
See application file for complete search history.

(56) References Cited

U.S. PATENT DOCUMENTS

D463,468 S * 9/2002 Fujita .......................... D16/202
2007/0253703 A1* 11/2007 Tsai ........................ G03B 17/02
396/429

FOREIGN PATENT DOCUMENTS

| CN | 2795923 | 7/2006 |
|----|---------|--------|
| CN | 2809698 | 8/2006 |
| CN | 104035494 | 9/2014 |
| CN | 105049691 | 11/2015 |

(Continued)

OTHER PUBLICATIONS

International Search Report for PCT/CN2016/101063 dated on Nov. 29, 2016.

*Primary Examiner* — Clayton E. LaBalle
*Assistant Examiner* — Linda B Smith
(74) *Attorney, Agent, or Firm* — Calfee, Halter & Griswold LLP (57) ABSTRACT

A connector includes: a rear case, fixed on a rear side of a display; a first component, provided on the rear case; and a second component, adapted to the first component and connectable to the image capturing device. According to the present disclosure, the image capturing device is connectable to the second component.

18 Claims, 9 Drawing Sheets

(56) References Cited

FOREIGN PATENT DOCUMENTS

| CN | 205302096 | 6/2016 |
|----|-----------|--------|
| JP | 2006115543 | 4/2006 |

\* cited by examiner

CONNECTOR FOR IMAGE CAPTURING DEVICE AND DISPLAY DEVICE INCLUDING THE CONNECTOR

CROSS REFERENCE

The present application is based on International Application No. PCT/CN2016/101063, filed on Sep. 30, 2016, which is based upon and claims priority to Chinese Patent Application No. 201620009297.2, filed on Jan. 5, 2016, and the entire contents thereof are incorporated herein by reference.

TECHNICAL FIELD

The present disclosure relates to the field of display technology, in particular, to a connector for an image capturing device and a display device including the connector.

BACKGROUND

Nowadays, a display device is usually provided with an image capturing function since the functions of computers are becoming more and more powerful. In one implementation, the image capturing device is physically and electrically connected to the display device, such that the computer may capture static images and dynamic images using the external image capturing device.

The image capturing device is usually disposed at a position close to the display device for ease of use. Currently, the image capturing device is generally fixed to a frame of the display device using a built-in hooding part. Alternatively, in the case where the image capturing device has a chassis, the image capturing device is disposed beside the display device.

On one hand, in the case where the image capturing device is held onto the frame of the display device, it is possible to damage the frame of the display device. On the other hand, in the case where the image capturing device is disposed beside the display device, it will occupy extra space.

It should be noted that, information disclosed in the above background portion is provided only for better understanding of the background of the present disclosure, and thus it may contain information that does not form the prior art known by those ordinary skilled in the art.

SUMMARY

The present disclosure provides a connector for an image capturing device and a display device including the connector.

According to one aspect, the present disclosure provides a connector for an image capturing device, including: a rear case, fixed on a rear side of a display; a first component, provided on the rear case; and a second component, adapted to the first component and connectable to the image capturing device.

According to another aspect, the present disclosure further provides a display device including a display and the above connector for an image capturing device.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

DETAILED DESCRIPTION

Hereinafter, the display device according to the present disclosure will be described in further detail with reference to the accompanying drawings and particular embodiments of the present disclosure, such that those skilled in the art may have a better understanding of technical solutions of the present disclosure.

The First Embodiment

In the present embodiment, a connector for an image capturing device is provided. As illustrated in FIGS. 1-4, the connector includes: a rear case 2 fixed on a rear side of a display 1, a first component 3 provided on the rear case 2, and a second component 4, adapted to the first component 3 and connectable to the image capturing device 5.

According to the above configuration, the image capturing device 5 may be fixed onto the display device without damaging a frame of the display device.

In one embodiment, the first component 3 includes a first opening part and a second opening part formed on the rear case 2, and the second component 4 includes a fixing body and an auxiliary fixing part, wherein the fixing body is configured to be connected to the first opening part, and the auxiliary fixing part is configured to be connected to the second opening part, such that the fixing body is fixed in the first opening part. In the present embodiment, in particular, the fixing body is inserted into the first opening part and the auxiliary fixing part is inserted into the second opening part, such that a position of the fixing body in the first opening part is fixed.

In the present embodiment, the first opening part includes a first opening 31 formed on a first side frame 21 of the rear case 2, the fixing body includes a first inserter 41 configured to be connected to the first opening 31, and the first inserter 41 is able to be completely accommodated in the first opening 31 or separated from the first opening 31. Preferably, the first inserter 41 is inserted into the first opening 31 and the first inserter 41 is completely inserted into the first opening 31 or extracted from the first opening 31. Preferably, the first side frame 21 is a side frame of the rear case 2 corresponding to a top side of the display 1. It should be noted that the top side of the display 1 refers to a top side of the display 1 when a user is normally watching an image. The second opening part includes a second opening 32 formed on the first side frame 21 of the rear case 2. The second opening 32 is formed in opposite sides inside the first opening 31 and is communicated with the first opening 31. The auxiliary fixing part includes a fixing protrusion 42 disposed on a sidewall of the first inserter 41 facing the second opening 32. The fixing protrusion 42 is configured to be connected to the second opening 32. A first stopper 321 corresponding to the fixing protrusion 42 is provided on a sidewall of the second opening 32. The fixing protrusion 42 is configured to be in contact with the first stopper 321 such that the first inserter 41 is fixed inside the first opening 31. Preferably, the fixing protrusion 42 is inserted into the second opening 32. The fixing protrusion 42 inserted into the second opening 32 is in contact with the stopper 321, such that a position of the first inserter 41 inserted into the first opening 31 is fixed. As described above, the first inserter 41 may be completely inserted into the first opening 31 or extracted from the first opening 31. When the first inserter 41 is completely inserted into the first opening 31, the fixing protrusion 42 is stuck by the first stopper 321. At this time, the first opening 31 and the second opening 32 function to accommodate the first inserter 41 and the fixing protrusion 42. When the first inserter 41 is extracted from the first opening 31, a portion of the first inserter 41 protrudes from the first opening 31. As such, the image capturing device 5 may be clamped on the portion of the first inserter 41 protruding from the first opening 31. Accordingly, the image capturing device 5 will not damage the frame of the display 1.

In the present embodiment, the display may further include a power source interface for providing power to the image capturing device 5. Preferably, a position of the power source interface corresponds to the first side frame 21 of the rear case 2. More preferably, the position of the power source interface corresponds to a bottom end of the first opening 31. The first component 3 further includes a third opening 33 and a fourth opening 34 formed on the first side frame 21 of the rear case 2. Both the third opening 33 and the fourth opening 34 are communicated with the first opening 31. The third opening 33 and the fourth opening 34 are disposed at the bottom end of the first opening 31 away from the first side frame 21. The second component 4 further includes a cover plate 43. The cover plate 43 is adapted to the third opening 33 and the fourth opening 34 to close the third opening 33 and the fourth opening 34, thereby protecting the power source interface. In the case where the cover plate 43 completely closes the third opening 33 and the fourth opening 34, the power source interface will not be exposed to the outside, thereby protecting the power source interface.

In the present embodiment, the first inserter 41 is provided with a first slot 411. Preferably, the first slot 411 extends in a direction parallel to a direction along which the first inserter 41 is inserted into the first opening 31. The cover plate 43 includes a first sub plate 431, a second sub plate 432 and a third sub plate 433 formed integrally. The first sub plate 431 is configured to close the third opening 33. The third opening 33 is provided on the sidewall thereof with a second stopper 331. The first sub plate 431 may be in contact with the second stopper 331 to prevent the cover plate 43 from moving relative to the third opening 33 and the fourth opening 34. The second sub plate 432 is configured to close the fourth opening 34.

The third sub plate 433 is inserted and slidable in the first slot 411. Preferably, the third sub plate 433 may slide along an extension direction of the first slot 411, such that the cover 43 closes or opens the third opening 33 and the fourth opening 34. The third sub plate 433 and the first slot 411 are configured such that the cover plate 43 may easily close the third opening 33 and the fourth opening 34, and may be easily moved away from the third opening 33 and the fourth opening 34. When the cover plate 43 closes the third opening 33 and the fourth opening 34, the power source interface is not exposed to the outside, thereby protecting the power source interface. When the cover plate 43 does not close the third opening 33 and the fourth opening 34, the power source line of the image capturing device 5 may be connected to the power source interface, so as to provide power to the image capturing device 5 through the power source interface.

In the present embodiment, the image capturing device 5 includes a holding part 51 configured to be able to clamp the first inserter 41 protruding from the first opening 31, such that the image capturing device 5 may be fixed relative to the rear case 2.

In the present embodiment, the rear case 2 and the first component 3 are formed of plastic material. In this way, the connector may be formed lighter in weight. The second component 4 is formed of rubber material or plastic material. In this way, a portion of the second component 4 protruding from the rear case 2 may be flexible, thereby cushioning impact of external forces.

While it is required to connect the image capturing device 5 to the rear case 2, firstly, a portion of the first inserter 41 inserted into the first opening 31 is extracted from the first opening 31 (e.g., ½ of the total length of the first inserter 41 is extracted), and then the holding part 51 of the image capturing device 5 may clamp the extracted portion of the first inserter 41. Next, the cover plate 43 slides along the extension direction of the first slot 411, such that the cover plate 43 is moved away from the third opening 33 and the fourth opening 34, and the power source line of the image capturing device 5 is connected to the power source interface of the display device through the third opening 33 and the fourth opening 34, thereby providing power to the image capturing device through the power source interface.

The Second Embodiment

Figure 1:
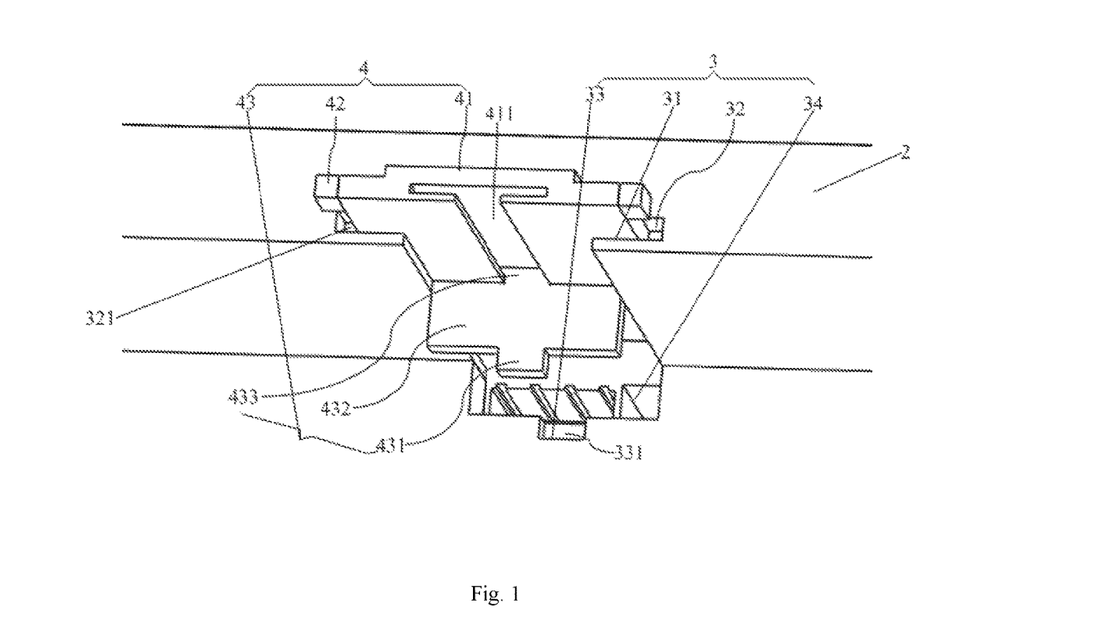
FIG. 1 illustrates a schematic diagram of a first component and a second component of a connector according a first embodiment of the present disclosure.
Figure 2:
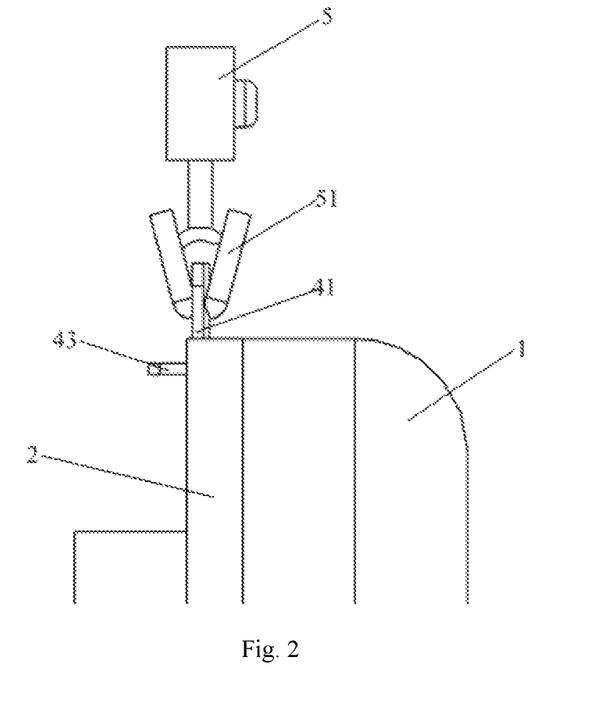
FIG. 2 illustrates a side view of the connector being in connection with a display device according to the first embodiment of the present disclosure.
Figure 3:
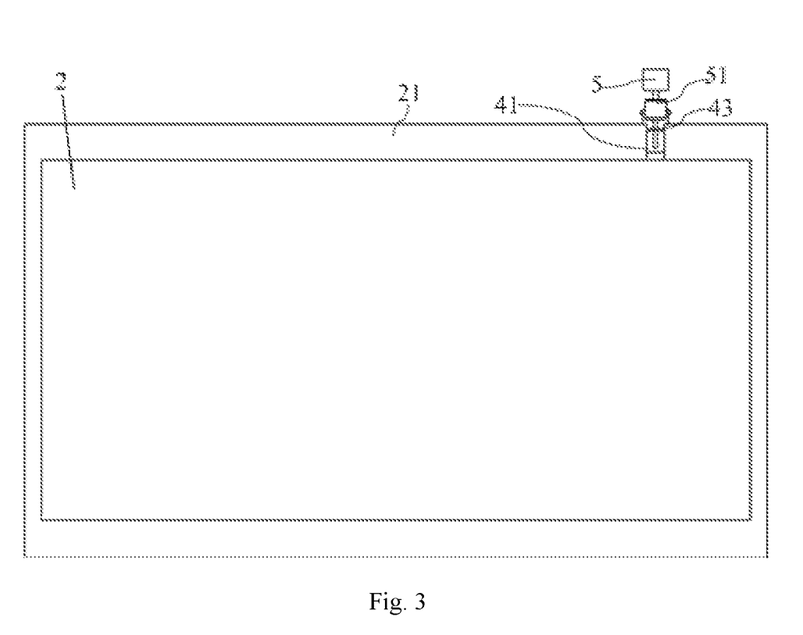
FIG. 3 illustrates a rear view of the connector being in connection with a display device according to the first embodiment of the present disclosure.
Figure 4:
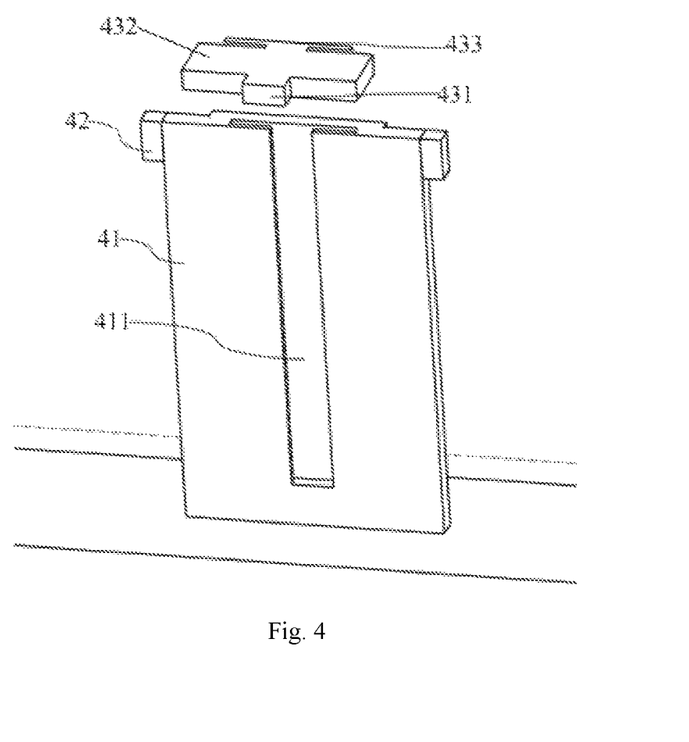
FIG. 4 illustrates a schematic diagram of the second component of the connector according to the first embodiment of the present disclosure.
Figure 5:
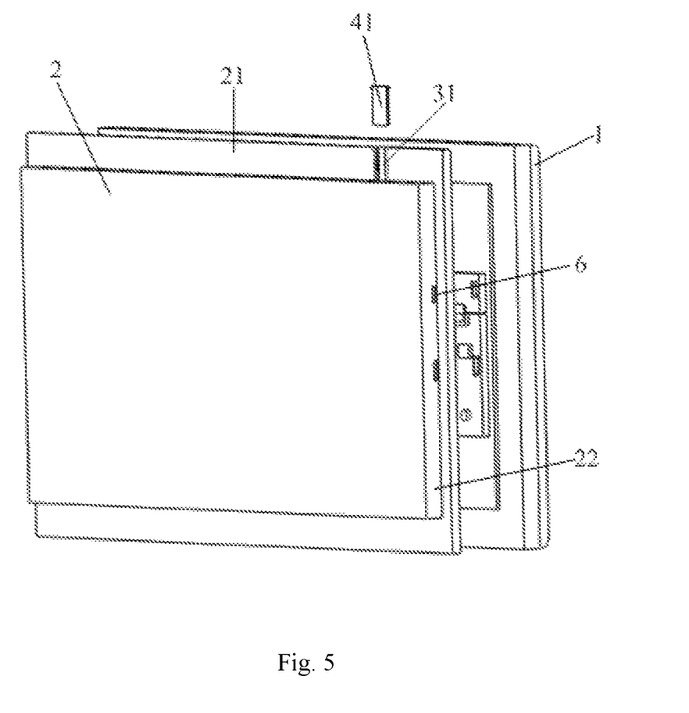
FIG. 5 illustrates a rear view of the connector according to a second embodiment of the present disclosure.
Figure 6:
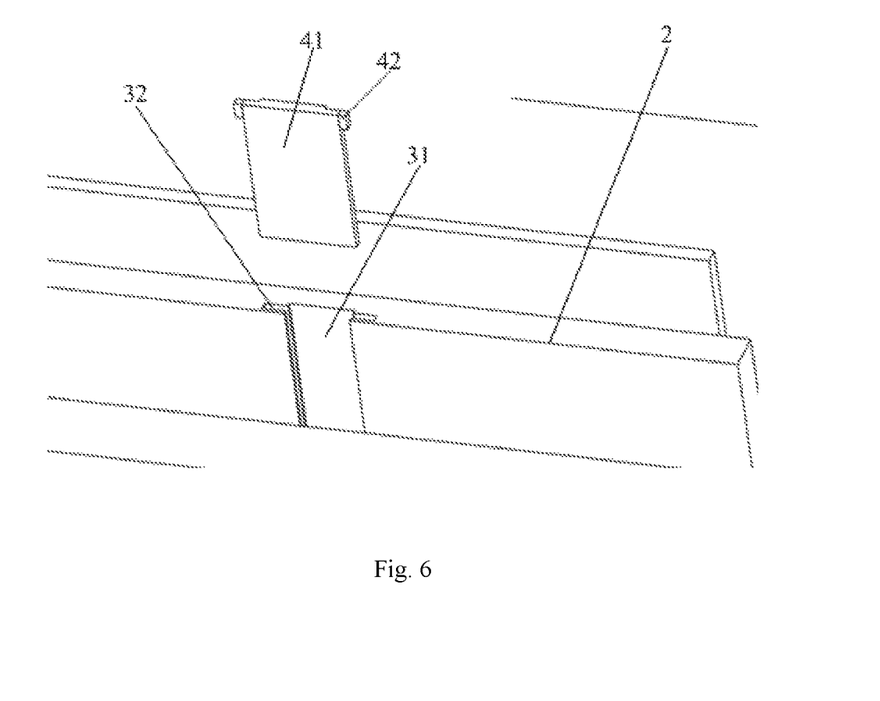
FIG. 6 illustrates a schematic diagram of a first component and a second component of the connector illustrated in FIG. 5.

The present embodiment provides a connector for an image capturing device. As illustrated in FIGS. 5 and 6, the present embodiment differs from the first embodiment in that: the first component 3 does not include the third opening and the fourth opening; and correspondingly, the second component 4 does not include the cover plate, and the first inserter 41 is not provided with the first slot.

In the present embodiment, the display further includes a power source interface 6 for providing power to the image capturing device. A position of the power source interface 6 corresponds to a second side frame 22 that may be disposed on the rear case 2. Preferably, the second side frame 22 is a side frame of the rear case 2 corresponding to the left side or right side of the display 1.

It should be noted that, the left side and the right side of the display 1 refer to a left side and a right side of the display 1 when a user is normally watching an image.

In the present embodiment, the position of the power source interface 6 corresponds to the second side frame 22 of the rear case, and thus the first component 3 does not include the third opening and the fourth opening. Correspondingly, the second component 4 does not include the cover plate, and the first inserter 41 is not provided with the first slot.

Other structures of the display device in the present embodiment are the same as those in the embodiment 1, which will not be repeated herein.

While it is required to connect the image capturing device 5 to the rear case 2, a portion of the first inserter 41 inserted into the first opening 31 is extracted from the first opening 31 (e.g., ½ of the total length of the first inserter 41 is extracted), and then the holding part 51 of the image capturing device 5 may clamp the extracted portion of the first inserter 41. Next, the power source line of the image capturing device is connected to the power source interface 6 provided on the second side frame 22 of the rear case 2.

The Third Embodiment

Figure 7:
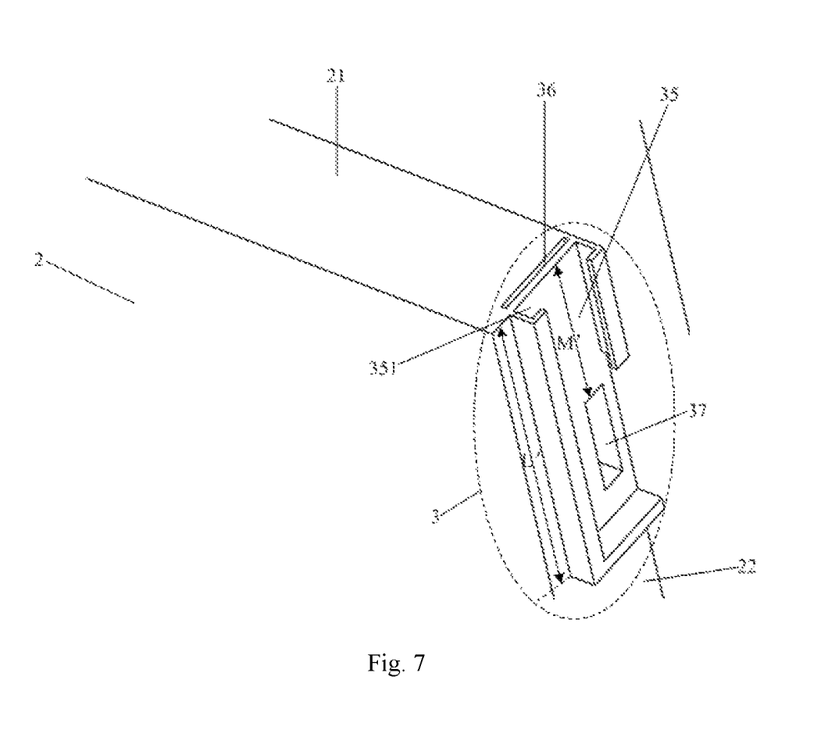
FIG. 7 illustrates a schematic diagram of a first component of a connector according to a third embodiment of the present disclosure.
Figure 8:
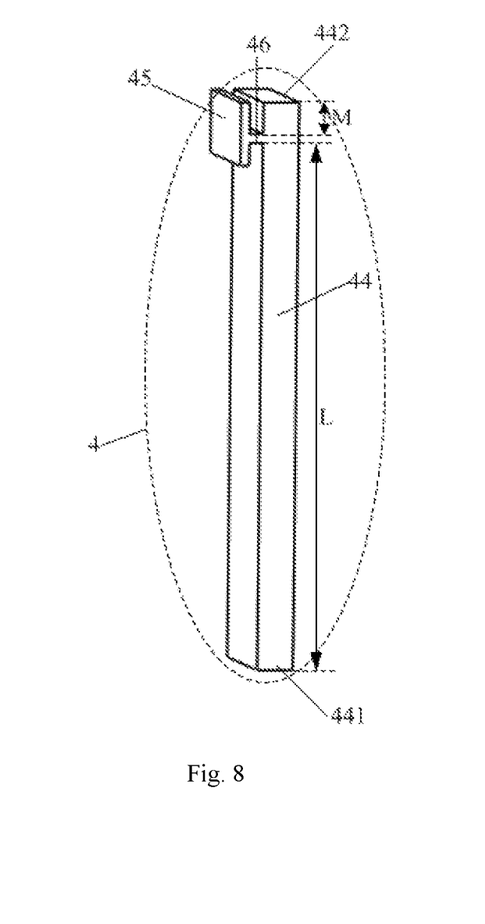
FIG. 8 illustrates a schematic diagram of a second component of the connector according to the third embodiment of the present disclosure.
Figure 9:
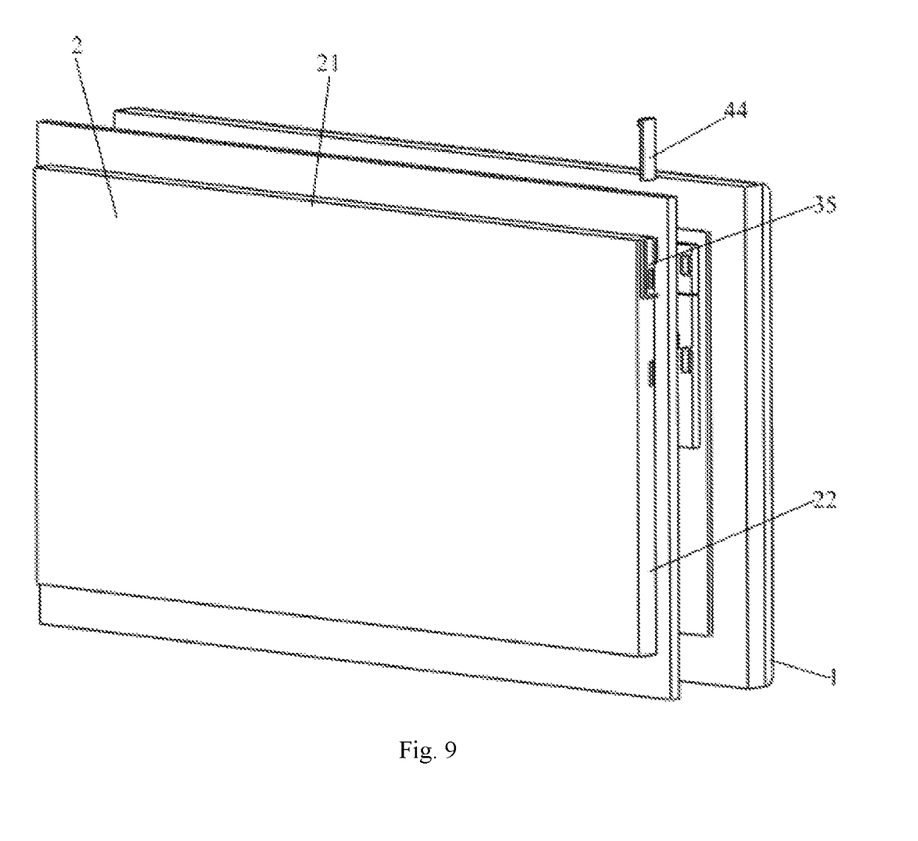
FIG. 9 illustrates a rear view of the connector according to the third embodiment of the present disclosure.

The present embodiment provides a connector for an image capturing device. As illustrated in FIGS. 7-9, the present embodiment differs from the first embodiment and the second embodiment in that: the first opening part is configured to be a second slot 35 disposed on a second side frame 22 of the rear case 2, and the second opening part is configured to be a fifth opening 36 formed on the first side frame 21. Preferably, the second side frame 22 is a side frame of the rear case 2 corresponding to the left side or the right side of the display 1, and the first side frame 21 is a side frame of the rear case 2 corresponding to the top side of the display 1. The fixing body is configured to be a second inserter 44. The auxiliary fixing part is configured as an auxiliary inserter 45. The second component further includes a connection plate 46. The second inserter 44 is connected to the auxiliary inserter 45 via the connection plate 46. The second slot 35 includes an entrance 351 disposed on the first side frame 21. The second inserter 44 is able to be partly accommodated into the second slot 35 through the entrance 351 or separated from the second slot 35. Preferably, a portion of the second inserter 44 may be inserted into the second slot 35 from the entrance 351 or protrude from the second slot 35. The auxiliary inserter 45 is able to be accommodated into the fifth opening 36. Preferably, the auxiliary inserter 45 is inserted into the fifth opening 36. The connection plate 46 is configured to connect and fix the second inserter 44 and the auxiliary inserter 45.

In the present embodiment, the power source interface is disposed at the second side frame 22 of the rear case 2. A sixth opening 37 is formed at the bottom of the second slot 35, and a power source line of the image capturing device is connectable to the power source interface through the sixth opening 37.

In the present embodiment, the second slot 35 extends along a length direction of the second side frame 22. The second inserter 44 is parallel to the auxiliary inserter 45. The connection plate 46 is perpendicular to the second inserter 44 and the auxiliary inserter 45, such that the second inserter 44, the auxiliary inserter 45 and the connection plate 46 may substantially form an "H" shape. A distance L between a first end 441 of the second inserter 44 and the connection plate 46 is longer than a distance M between a second end 442 of the second inserter 44 opposite to the first end 441 and the connection plate 46. Preferably, the second inserter 44 may be inserted into the second slot 35 along the length direction of the second slot 35.

The distance M between the second end 442 and the connection plate 46 equals to a distance M' between the entrance 351 of the second slot 35 and the sixth opening 37. The distance between the first end 441 and the connection plate 46 equals to a length L' of the second slot 35. The second inserter 44 is configured such that when the power source line of the image capturing device is connected to the power source interface. The second end 442 is inserted into the second slot 35. When the power source line of the image capturing device is not connected to the power source interface, the first end 441 is inserted into the second slot 35. That is, when the second end 442 is inserted into the second slot 35, the portion of the second inserter 44 inserted into the second slot 35 just exposes the sixth opening 37, such that the power source line of the image capturing device may be connected to the power source interface through the sixth opening 37, thereby providing power to the image capturing device through the power source interface. At this time, the image capturing device may be connected to a portion of the first end 441 protruding from the rear case 2. When the first end 441 is inserted into the second slot 35, a portion of the second inserter 44 inserted into the second slot 35 blocks the sixth opening 37. At this time, the second inserter 44 is not protruded from the rear case 2, and thus cannot be connected to the image capturing device.

In the present embodiment, the image capturing device includes a holding part connectable to the first end 441 of the second inserter 44 protruding from the second slot 35 of the rear case 2. Since the portion of the first end 441 protruding from the second slot 35 has a relative longer length, the holding part of the image capturing device may be more stably clamped thereon.

In the present embodiment, the rear case 2 and the first component 3 are formed of plastic material, and the second component 4 is formed of rubber material or plastic material.

While it is required to connect the image capturing device to the rear case 2, firstly, the second end 442 of the second inserter 44 is inserted into the second slot 35, such that the first end 441 of the second inserter 44 protrudes from the second slot 35. Afterwards, the holding part of the image capturing device is connected to the first end 441 of the second inserter 44, and the auxiliary inserter 45 is inserted into the fifth opening 36 to facilitate the fixing between the second inserter 44 and the rear case 2. Next, the power source line of the image capturing device is connected to the power source interface through the sixth opening 37, thereby providing power to the image capturing device through the power source interface.

The first to third embodiments of the present disclosure may have the following beneficial effects. The rear case is provided at the rear side of the display; the first component is provided on the rear case; and the second component is mounted on the first component, such that the image capturing device is connectable to the second component. Accordingly, the image capturing device may be fixed against the display without damaging the frame of the display. Meanwhile, by using the connector according to the present disclosure, the image capturing device and the display are more compact, thereby saving space.

On the other hand, the present disclosure further provides a display device including a display and the connector for the image capturing device according to any one of the first to third embodiments.

It should be appreciated that, the above embodiments are exemplary implementations for illustrating the principle of the present disclosure only, while the present disclosure is not limited thereto. Various modifications and improvements are possible to those ordinary skilled in the art without departing from the spirit and essence of the present disclosure. All these modifications and improvements will also fall into the protection scope of the present disclosure.

What is claimed is:

1. A connector for an image capturing device, comprising:
   a rear case, fixed on a rear side of a display;
   a first component, provided on the rear case; and
   a second component, adapted to the first component and connectable to the image capturing device,
   wherein the first component comprises a first opening part having a first opening and a second opening part having a second opening both formed on the rear case,
   wherein the first component further comprises a third opening and a fourth opening formed on the rear case, both the third opening and the fourth opening are communicated with the first opening, and the third opening and the fourth opening are disposed at a bottom end of the first opening; and
   the second component further comprises a cover plate, and the cover plate is adapted to the third opening and the fourth opening to close the third opening and the fourth opening.

2. The connector according to claim 1, wherein
   the second component comprises a fixing body and an auxiliary fixing part,
   the fixing body is configured to be connected to the first opening part, and
   the auxiliary fixing part is configured to be connected to the second opening part, such that the fixing body is fixed in the first opening part.

3. The connector according to claim 1, wherein the first inserter is provided with a first slot;
   the cover plate comprises a first sub plate, a second sub plate, and a third sub plate formed integrally;
   the first sub plate is configured to close the third opening;
   the second sub plate is configured to close the fourth opening; and
   the third sub plate is inserted and slidable in the first slot.

4. The connector according to claim 2, wherein the first opening is formed on a first side frame of the rear case, the fixing body comprises a first inserter configured to be connected to the first opening, and the first inserter is configured to be completely accommodated in the first opening or separabled from the first opening; and
   the second opening is formed on the first side frame of the rear case, the second opening is formed in opposite sides inside the first opening and is communicated with the first opening, the auxiliary fixing part comprises a fixing protrusion disposed on a sidewall of the first inserter facing the second opening and configured to be connected to the second opening, a first stopper corresponding to the fixing protrusion is provided on a sidewall of the second opening, and the fixing protrusion is configured to be in contact with the first stopper such that the first inserter is fixed inside the first opening.

5. The connector according to claim 2, wherein the first opening part comprises a second slot disposed on a second side frame of the rear case, and the second opening part comprises a fifth opening formed on the first side frame;
   the fixing body comprises a second inserter, and the auxiliary fixing part comprises an auxiliary inserter;
   the second component further comprises a connection plate, and the second inserter is connected to the auxiliary inserter via the connection plate;
   the second slot comprises an entrance disposed on the first side frame, and the second inserter is able to be partly accommodated into the second slot through the entrance or separated from the second slot;
   the auxiliary inserter is able to be accommodated into the fifth opening; and
   the connection plate is configured to connect and fix the second inserter and the auxiliary inserter.

6. The connector according to claim 3, wherein a second stopper is provided on a sidewall of the third opening, and the first sub plate covering the third opening is in contact with the second stopper, such that a position of the cover plate covering the third opening and the fourth opening is fixed.

7. The connector according to claim 4, wherein the display further comprises a power source interface for providing power to the image capturing device, and a position of the power source interface corresponds to the first side frame of the rear case.

8. The connector according to claim 4, wherein the image capturing device comprises a holding part configured to be able to be connected to the first inserter protruding from the first opening.

9. The connector according to claim 4, wherein the first side frame is a side frame of the rear case corresponding to a top side of a display screen.

10. The connector according to claim 5, wherein the display further comprises a power source interface for providing power to the image capturing device, and a position of the power source interface corresponds to a second side frame of the rear case.

11. The connector according to claim 5, wherein a length direction of the second inserter extends along a length direction of the second side frame;
    the second inserter is parallel to the auxiliary inserter, and the connection plate is perpendicular to the second inserter and the auxiliary inserter, such that the second inserter, the auxiliary inserter and the connection plate form an "H" shape;
    a distance between a first end of the second inserter and the connection plate is longer than a distance between a second end of the second inserter opposite to the first end and the connection plate;
    a distance between the second end and the connection plate equals to a distance between the entrance of the second slot and the sixth opening, and
    a distance between the first end and the connection plate equals to a length of the second slot.

12. The connector according to claim 5, wherein the second side frame is a side frame of the rear case corresponding to a left side or a right side of a display screen.

13. The connector according to claim 10, wherein a sixth opening is formed at a bottom of the second slot, and a power source line of the image capturing device is connectable to the power source interface through the sixth opening.

14. The connector according to claim 11, wherein the image capturing device comprises a holding part connectable to the first end of the second inserter protruding from the second slot of the rear case.

15. A connector for an image capturing device, comprising:
    a rear case, fixed on a rear side of a display;
    a first component, provided on the rear case; and a second component, adapted to the first component and connectable to the image capturing device, wherein the rear case and the first component are formed of plastic material, and the second component is formed of rubber material or plastic material.

16. A display device comprising a display, wherein the display device further comprises a connector for the image capturing device according to claim 1.

17. A display device comprising a display, wherein the display device further comprises a connector for an image capturing device according to claim 15.

18. A connector for an image capturing device, comprising:
- a rear case, fixed on a rear side of a display;
- a first component, provided on the rear case; and
- a second component, adapted to the first component and connectable to the image capturing device,
- wherein the first component comprises a plurality of openings, and a power source interface for providing power to the image capturing device is provided in at least one of the openings, and
- the second component comprises a cover plate disposed over the power source interface.

\* \* \* \* \*